Oct. 18, 1932.   F. H. VIETS   1,883,168
APPARATUS FOR VISUAL MEASUREMENT OF CONCENTRATION
OF SUSPENDED MATERIAL IN GASES
Filed March 17, 1930   3 Sheets-Sheet 3
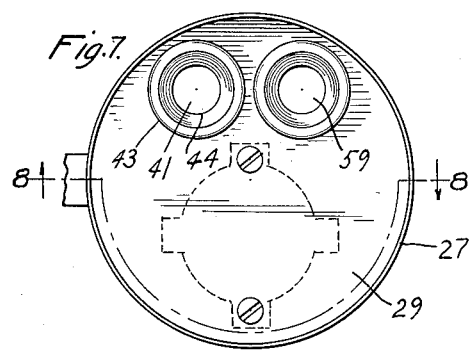
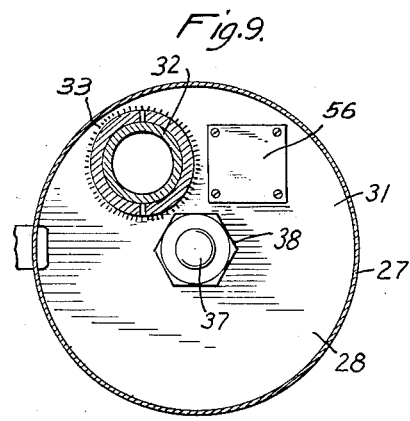
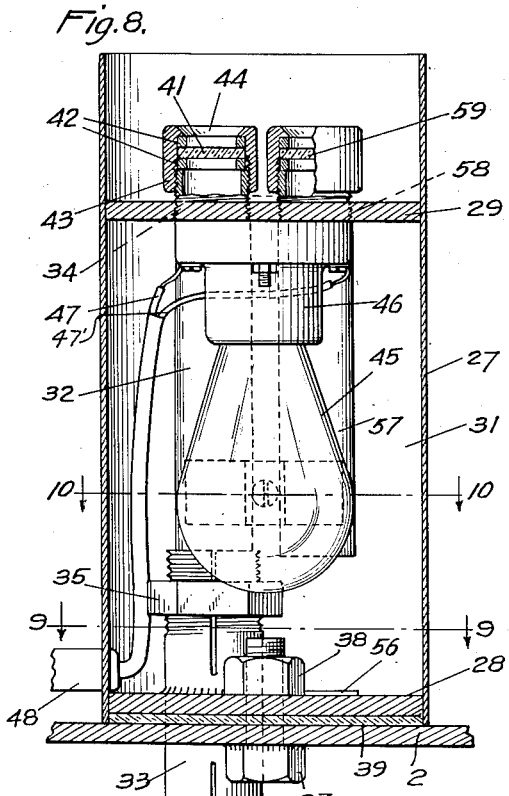
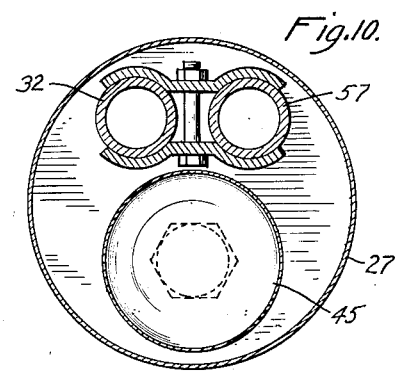
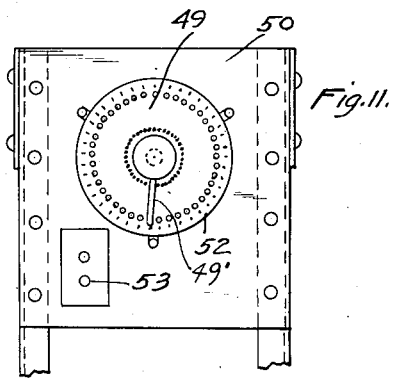
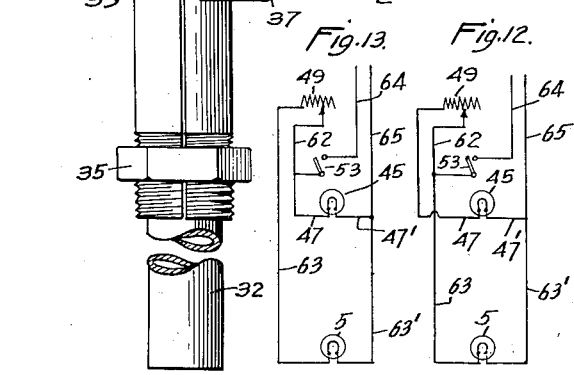
INVENTOR.
Floyd H. Viets,
BY Arthur P. Knight and
Alfred W. Knight
ATTORNEYS Patented Oct. 18, 1932

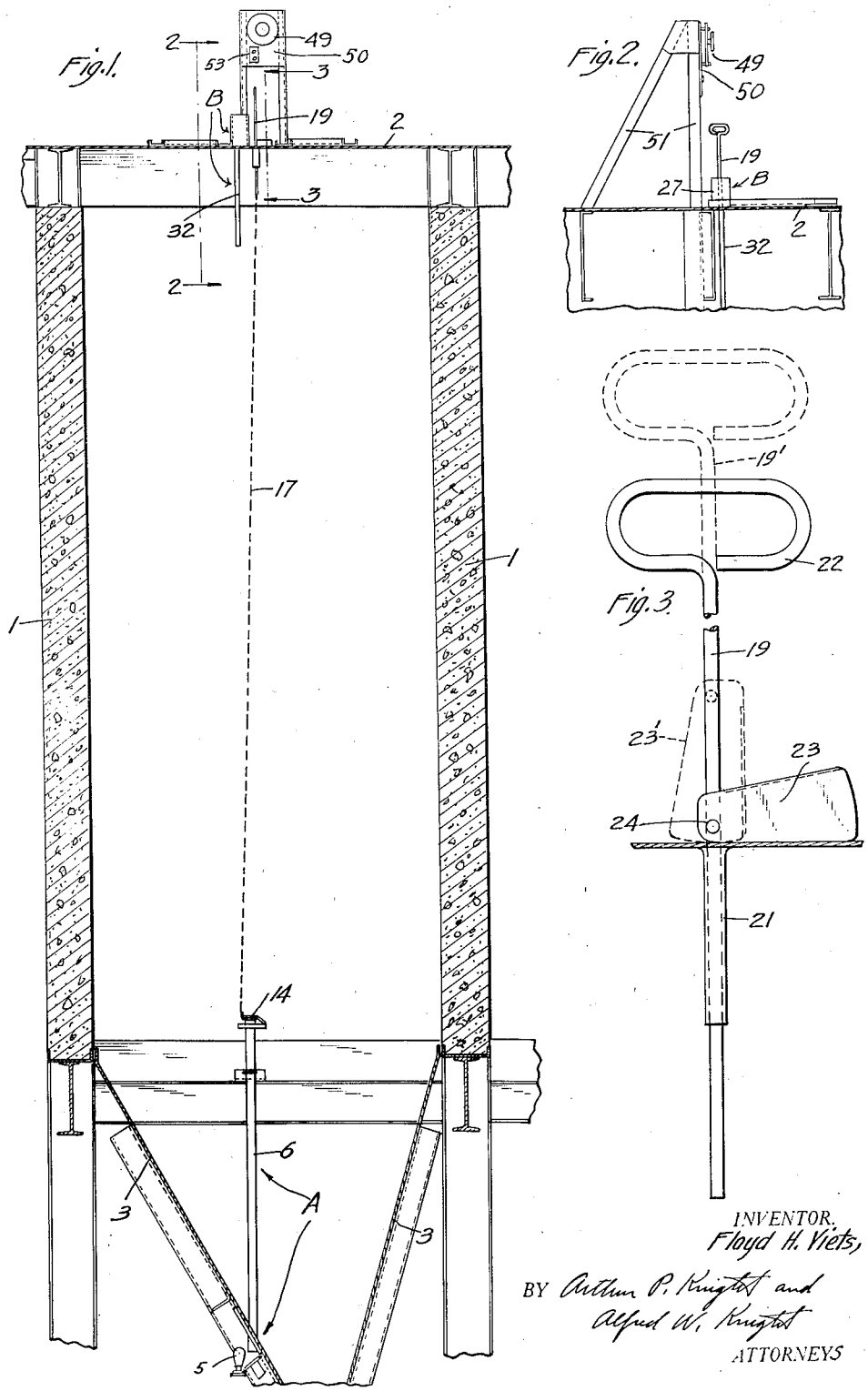

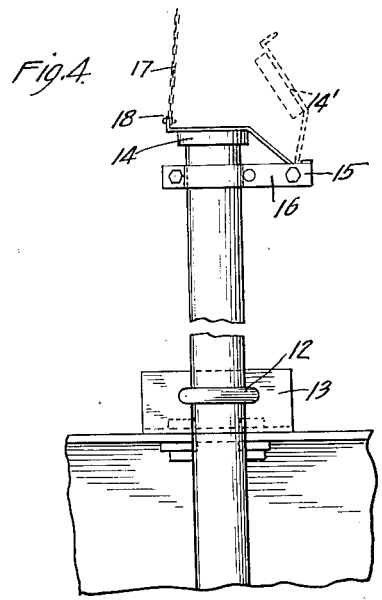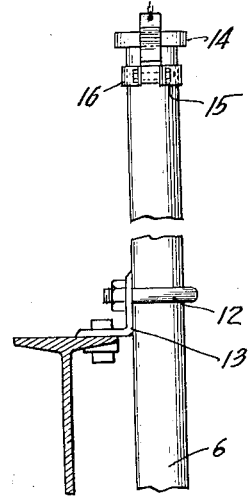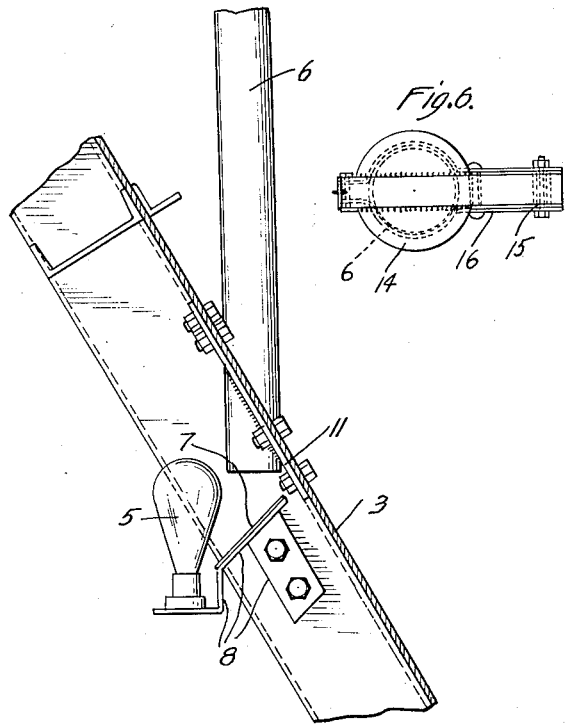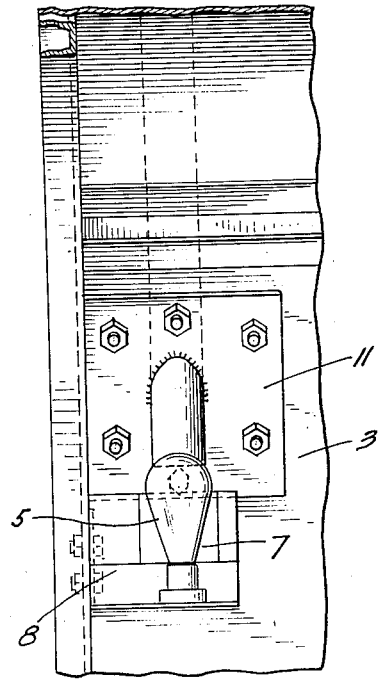

1,883,168

UNITED STATES PATENT OFFICE

FLOYD H. VIETS, OF GLENDALE, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR VISUAL MEASUREMENT OF CONCENTRATION OF SUSPENDED MATERIAL IN GASES

Application filed March 17, 1930. Serial No. 436,596.

This invention relates to the determination of the concentration or amount of suspended material contained in a gas and while it is particularly intended for use in connection with gases flowing through a flue or conduit, such as the gases entering or leaving an electrical precipitator or other gas cleaning apparatus, it may also be used in connection with relatively stationary or quiescent bodies of gas in a chamber or the like.

The principal object of the invention is to provide a simple apparatus for the above purpose, which may be operated quickly and without disturbing in any way the normal flow or quiescent state of the gas, and which will give an accurate measurement of the concentration or amount of suspended material contained in the gas.

A further object of the invention is to provide means for preventing deposition of suspended material from the gas upon any operating parts of the apparatus, and thus maintain the apparatus at all times in condition for satisfactory and accurate operation.

Generally speaking, the apparatus comprising two sources of light, means for viewing one of said sources of light through the body of gas on which the measurement is to be made, means for viewing the other source of light directly, said two light viewing means being preferably so situated as to permit simultaneous observation and visual comparison of the respective light sources, and means for varying and measuring the intensity of illumination of one of said sources of light, preferably the directly viewed light source. It will be evident that with such preferred arrangement, the intensity of the directly viewed light source may be varied until it appears as of the same intensity as the other light source viewed through the body of gas containing suspended material, and the measurement of the intensity of illumination of the directly viewed light source at that time will give an indication or measurement of the relative concentration or amount of suspended material in the gas. It is also possible to use a directly viewed light source of relatively low fixed intensity, and to provide for varying the intensity of the other light source until said other light source, when viewed through the body of gas, appears of the same intensity as the directly viewed light source, and for measuring the intensity of said other light source. By calibrating the measuring means for the intensity of illumination of the variable light source, by means of actual tests of the concentration of suspended material, the measurements may be obtained directly in terms of concentration of suspended material in the body of gas.

The apparatus is, in general, applied in connection with housing means for the gas, such as a flue or conduit through which the gas is passed, or a chamber in which the gas is contained; and the light source to be viewed through the gas and the means for observing the same are so located as to include the desired length of path of the light through the gas between said source and said observing means, said light source being preferably located adjacent one side of said housing and said observing means being preferably located adjacent another side of said housing.

The accompanying drawings illustrate apparatus embodying my invention, as applied to a flue or conduit adapted for passage of gas therethrough, and referring to said drawings:

Fig. 1 is a transverse section through such a flue or conduit having means according to my invention for measurement of the concentration of suspended material therein.

Fig. 2 is a section on line 2—2 in Fig. 1.

Fig. 3 is a sectional view on line 3—3 in Fig. 1.

Fig. 4 is a side elevation of a part of the apparatus located at the lower side of said flue and comprising the source of light adapted to be viewed through the body of gas.

Fig. 5 is an elevation of the same taken from the left side of Fig. 4.

Fig. 6 is a plan view of the upper part of the apparatus shown in Fig. 4.

Fig. 7 is a plan view of the part of the apparatus located at the upper side of the flue and containing the directly viewed light source and the means for observation of both the sources of light.

Fig. 8 is a vertical section on line 8—8 in Fig. 7.

Figs. 9 and 10 are horizontal sections on lines 9—9 and 10—10 respectively in Fig. 8.

Fig. 11 is a front elevation of the means for varying and measuring the intensity of one of the sources of light.

Fig. 12 is a wiring diagram of the preferred embodiment of the invention.

Fig. 13 is a wiring diagram of a modified arrangement.

The gas flue or conduit, as shown particularly in Fig. 1, comprises side walls 1, top wall 2 and downwardly and inwardly inclined bottom walls 3 adapted to provide a hopper space 4 at the bottom of the flue to facilitate removal therefrom of any material settling in said flue.

The means for directing a beam of light through the body of gas within the flue is indicated in general at A in Fig. 1, and is shown as located at the lower side of the flue, while the means for viewing or observing said beam of light and comparing the intensity thereof with another directly viewed source of light, preferably of variable and measurable intensity, is indicated in general at B in said figure, and is shown as mounted at the upper side of the flue, but it will be understood that said light directing and observation means may be mounted in any suitable positions with respect to the flue such as to include the desired length of path through the gas between said means. The flue shown in the drawings is of considerably greater height than width, as is customary in the construction of flues connected to or forming part of electrical precipitation apparatus, and in such cases I find it advantageous to locate said light directing and observation means in the relative positions above mentioned, so as to direct the light beam vertically through substantially the entire height of the gas stream, in other words the larger cross sectional dimension thereof, since the longer the path of the light beam through the gas, the greater will be the effect of the suspended material in the gas in reducing the intensity of said light beam and hence the more accurate will be the readings obtained.

Referring particularly to Figs. 4, 5 and 6, the means for directing the beam of light through the gas stream is shown as comprising a suitable source of light of substantially constant intensity such as an electric lamp 5, a light directing tube 6 extending substantially vertically and a light diffusive reflecting means 7 mounted in position to reflect light from the source 5 upwardly through said light directing tube. The reflecting means may comprise, for example, a dull aluminum finished plate or screen and said reflecting means as well as the source of light 5 are shown as mounted adjacent a wall of the flue on a supporting bracket 8 so that said source of light and reflecting means are outside of one of the sloping bottom walls 3 of the flue, so as to prevent dust or suspended matter settling thereon from the gas within the flue and also permit easy access thereto so that the same may be kept clean and in good condition for operation at all times. Lamp 5 and reflecting means 7 may, in a broad sense, be considered as jointly comprising the source of light adapted to be viewed through the gas. The vertical light directing tube 6 extends at its lower end through one of the bottom walls 3, and the lower end of said tube is disposed adjacent the reflecting means 7 and in position to receive and transmit light reflected therefrom, while the upper portion of said tube preferably extends upwardly within the flue for a sufficient distance to confine the light transmitted therethrough to a relatively small parallel beam directed upwardly through the gas. Said tube also preferably extends up to a level above the hopper space 4 between the sloping bottom walls 3 so as to always extend up through any body of settled dust or other material which may normally collect in said hopper space. Said tube may be mounted in any suitable manner but is shown as welded or otherwise secured adjacent its lower end to a supporting plate 11 which is in turn secured to the hopper wall 3 and as being further supported by clamping means such as U bolt 12 and bracket 13 adjacent the upper end thereof.

In order to prevent entrance of dust or suspended material from the gas into said tube and to also prevent inflow or outflow of air or gas therethrough, I prefer to provide a removable cover or cap 14 hingedly mounted as at 15 on supporting means 16 clamped to the upper end of said tube so as to permit movement thereof into or out of position over the upper end of said tube. Means are also preferably provided for permitting operation of said cover from a position adjacent the light observing means, such operating means being shown as comprising a chain or other pull member 17 connected at its lower end as at 18 to the cover 14 at the side opposite the hinge 15 and connected at its upper end to an operating rod 19 extending slidably through a guide sleeve 21 secured to the top wall 2 and having at its upper end a handle 22 for manual operation thereof. Operating rod 19 is also preferably provided with means for holding the same against falling when in either lowered or raised position corresponding respectively to closed and open position of the cover 14. Said holding means is shown as comprising a small plate 23 pivotally connected at 24 to said rod and of such dimensions that when swung about said pivot to the position shown in full lines in Fig. 3, it permits rod 19 to be lowered sufficiently to allow cover 14 to fall into closed position, but when swung to the other position as indicated in dotted lines at 23' in said figure, it will hold bar 19 in raised position as indicated in dotted lines at 19', and thus hold said cover in open position as indicated in dotted lines at 14' in Fig. 4.

The means indicated at B in Fig. 1, for viewing the beam of light directed through the body of gas and for comparing the intensity thereof with that of the directly viewed light source which is preferably of variable and measurable intensity, is shown more particularly in Figs. 7 to 10 inclusive. Such apparatus comprises a cylindrical box or casing 27 provided with a bottom plate 28 and an upper plate 29 serving to enclose a light-proof chamber 31. A tube 32 extends through a clamping sleeve 33 secured to the bottom plate 28 and is threaded, as shown at 34, through the upper plate 29. Said tube may be clamped in position within sleeve 33 by means of clamping nuts 35 on the slotted upper and lower ends of said sleeve, and the casing 27 is mounted on the top wall 2 as by means of bolt and nut 37 and 38, in such position as to bring said tube 32 directly above and in alignment with the light directing tube 6 at the bottom of the flue. Asbestos or other suitable packing means 39 is preferably provided between the bottom plate 28 and the top flue wall 2. The upper end of tube 32 constitutes a sight opening through which the beam of light projected through the body of gas may be viewed. A disc 41 of glass or other transparent material is preferably provided over said opening, said disc being held in position by any suitable means, for example by means of gaskets 42 and a cap 43 threadedly secured to the upper end of tube 32 and having an opening 44 permitting observation therethrough.

The directly viewed light source is shown as comprising an electric lamp 45 mounted in suitable position within the casing 27, as for example by means of a suitable receptacle 46 secured to the upper plate 29. The electrical supply connections for said lamp comprise wires 47 and 47' extending out through a substantially lightproof bushing 48 in the cylindrical casing 27, one of said wires preferably including suitable means for regulating the current to said lamp, such as a rheostat 49 mounted preferably in a position adjacent the point of observation of the two sources of light, as for example on a panel 50 secured to supporting frame means 51, as shown in Fig. 11. Said rheostat is preferably provided with a scale 52 cooperating with the end of the contact controlling arm 49' thereof to indicate the setting of said rheostat and hence give a measurement of the intensity of illumination of lamp 5. A switch 53 for simultaneously closing or opening the circuits of lamps 5 and 45 is also preferably mounted adjacent said rheostat, for example on the panel 50, as shown.

Within the chamber 31 and in position to receive light from lamp 45 is provided a light diffusive reflecting plate 56 preferably having a dull finish surface, said plate being shown as secured in any suitable manner to the bottom plate 28 in a position adjacent the clamping sleeve 33. The light source or lamp 45 and the diffusing reflector 56 are both located outside of the flue but adjacent to a wall of the flue. Said reflecting means 56 may, in a broad sense, be considered as part of the directly observed source of light. A light viewing tube 57 extends through the upper plate 29 and is directed toward the light reflecting plate 56, said tube preferably extending, as shown, to a position adjacent the bottom of the source of light 45, so as to prevent direct entrance of light from said source into said tube and permit observation therethrough of only the light reflected from plate 56. Said tube is shown as threaded through the plate 29 at 58 and the upper end thereof constitutes another sight opening which is also preferably covered by a glass disc 59 secured in similar manner to the disc 41. The tubes 57 and 32 preferably extend substantially parallel and close to one another, so that the respective sight openings thereof are sufficiently close together to permit simultaneous observation of light through both of said tubes.

As shown in Fig. 12, one of the wires, such as 47, from lamp 45, is connected to one side of rheostat 49, while the other side of said rheostat is connected by wire 62 to switch 53. The electrical connections for the lamp 5 may include wires 63 and 63', one of which, such as 63, is also connected to the switch 53. One of the main supply wires 64 is connected to the other side of said switch, while the other of said supply wires 65 is connected to the wires 47' and 63' leading to the respective lamps.

Normally, the cover 14 is in lowered or closed position over the end of tube 6, and switch 53 is open so that lamps 5 and 45 are not burning. However, when it is desired to operate the apparatus to determine the concentration of suspended material contained in the moving or stationary body of gas between the upper end of tube 6 and the lower end of tube 32, switch 53 is closed to illuminate both lamps 5 and 45 and cover 14 is then raised by means of operating rod 19 as above described. The operator, by looking through the two sight openings, may observe directly through tube 57 the light reflected by plate 56 and may at the same time observe through tube 32 the light directed from the lower lamp 5 through tube 6 and through the body of gas. It is obvious that the observed intensity of the light from this latter source will vary in accordance with the concentration of suspended material in the gas through which it passes and that for suspended material of practically uniform characteristics, such intensity may be taken fairly accurately as a measure of the concentration of suspended material. Since the light from lamp 45, reflected from plate 56, is viewed directly and without passage through any substantial amount of dirty gas, its observed intensity will normally be brighter than that of the other lamp, but the intensity of lamp 45 may be reduced by reducing the current flow therethrough by means of rheostat 49, until the observed intensity of the two sources of light appears equal. The intensity of illumination of lamp 45 at this time, as indicated for example by the setting of the rheostat with respect to the scale means 52, will give an indication or measurement of the concentration of suspended material in the gas. By making a series of tests, by any standard methods such as now in common use, of the concentration of suspended material in the gas and determining the setting of the rheostat 49 or other intensity controlling means for each of such concentrations, the scale means 52 may readily be calibrated so as to read directly in terms of concentration of suspended material in the gas, or the readings of said scale may be in any arbitrary units and may be converted to terms of concentration by means of suitable charts or calculations.

A slightly different arrangement of the electrical connections is shown in Fig. 13. In this case the rheostat 49 is connected to one of the wires such as 63 leading to the lamp 5 which is to be observed through the body of gas, while the wire 47 connects the directly observed lamp 45 directly to the switch 53, the connections and other parts of the apparatus being the same as above described. In this case it is necessary that the intensity of illumination of the directly observed source of light 45 be considerably less than the maximum intensity of illumination of the source of light to be observed through the body of gas, so that even when the light projected from said last mentioned source is dimmed by the suspended material in the gas it will require still further diminution by means of rheostat 49 to reduce the observed intensity thereof to equal the observed intensity of lamp 45. In this case the setting of rheostat 49 will, therefore, give an indication of the required amount of such further diminution of intensity of the lower lamp 5 and thus indirectly be an indication of the dimming caused by the suspended material in the gas and consequently of the concentration of the suspended material.

I claim:

1. In combination with a flue adapted for passage of gas therethrough, a source of light located adjacent a wall of said flue, a light diffusive reflecting means mounted in position to be illuminated by said source of light, said source of light and said reflecting means being located outside of said flue, a light directing tube in position to receive light from said reflecting means and to direct such light through the gas in said flue, sight means adjacent another wall of said flue opposite said first-named wall and aligned with said light directing tube but spaced therefrom, another source of light and another diffusive reflecting means mounted in position to be illuminated thereby, said last named source of light and diffusive reflecting means being mounted outside the flue and adjacent the wall of the flue opposite said light directing tube, sight means in position to receive light directly from said last named diffusive reflecting means, said two sight means being so positioned as to permit simultaneous observation therethrough of light received thereby from the respective reflecting means, and means for varying and measuring the intensity of illumination of one of said sources of light.

2. In combination with a flue, a source of light positioned outside a wall of said flue, a light directing tube extending through said wall and positioned to receive light from said source of light and to direct such light across said flue, a sight tube extending through a wall of said flue opposite said first named wall aligned with said light directing tube, another source of light mounted adjacent said last named wall, additional sight means adjacent said sight tube and positioned to permit direct observation of said last named source of light, means for measuring and varying the intensity of illumination of one of said sources of light, closure means for closing the inner end of said light directing tube for the purpose set forth, and manually operable means adjacent said sight tube and connected to said closure means to operate the same.

3. In combination with a flue comprising side, top and bottom walls, a source of light positioned outside said bottom wall, a light directing tube extending through said bottom wall and positioned to receive light from said source of light and to direct such light upwardly through said flue, a sight tube extending through the top wall of said flue and aligned with said light directing tube, another source of light mounted adjacent said top wall, additional sight means adjacent and substantially parallel to said sight tube and positioned to permit direct observation of said last named source of light, and means adjacent said sight means for varying and measuring the intensity of illumination of said last named source of light.

In testimony whereof I have hereunto subscribed my name this 5th day of March 1930.

FLOYD H. VIETS.